Sept. 25, 1928.

A. N. SCHAEFER

BRUSH AX

Filed Aug. 22, 1924

1,685,141

INVENTOR.
ALBERT N. SCHAEFER.
BY HIS ATTORNEY.
James F. Williamson

Patented Sept. 25, 1928.

1,685,141

UNITED STATES PATENT OFFICE.

ALBERT N. SCHAEFER, OF MINNEAPOLIS, MINNESOTA.

BRUSH AX.

Application filed August 22, 1924. Serial No. 733,634.

This invention has for an object to provide a highly efficient ax for cutting brush close to the ground, adapted to be swung in a radius tangential to the ground, with the blade substantially parallel therewith at the moment of impact with the object struck.

It is a more specific object to provide such an ax comprising a minimum number of parts and adapted to be used by either a right or left handed operator.

A further object is to provide a double edged blade carried by an elongated handle extending obliquely from said blade and in a plane perpendicular thereto.

Figure 1:
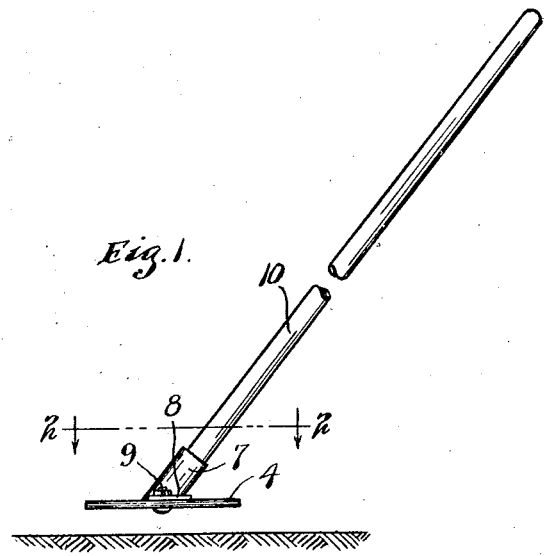
Figure 2:
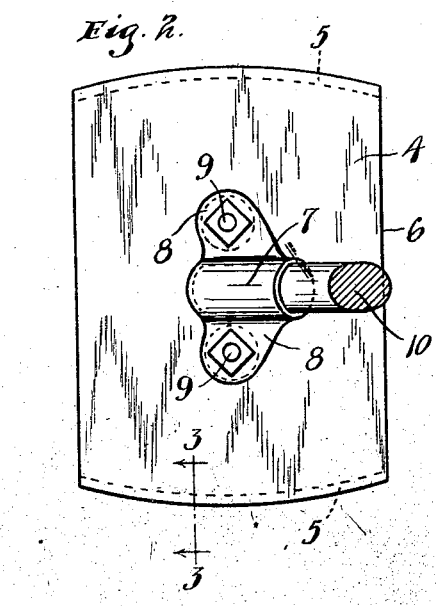
Figure 3:

These and other objects of the invention will be apparent from the following description made in connection with the accompanying drawings, in which like notations refer to similar parts throughout the several views, and in which Fig. 1 is a fragmentary side elevation of the ax;

Fig. 2 is a horizontal cross section taken on the line 2—2 of Fig. 1 and showing most of the parts in full; and Fig. 3 is a fragmentary longitudinal section taken on the line 3—3 of Fig. 2.

The numeral 4 denotes a flat substantially rectangular blade having slightly convex cutting edges 5 formed by beveling a pair of the opposite edges of said blade, as shown in Fig. 3, and having the slightly longer non-cutting edges 6. A cylindrical handle socket 7, equipped at its lower end with a pair of apertured ears 8 disposed in a plane at an oblique angle of the axis thereof, is detachably secured to the approximate center of the top surface of blade 4 by means of nutted bolts 9, which pass through alined holes in the longitudinal center of said blade and extend through the apertured ears 8. This socket is thus attached centrally of blade 4 inclining towards one of the non-cutting edges of the blade at an oblique angle thereto. An elongated handle 10 of usual type is firmly seated at its lower end in socket 7, extending at an oblique angle to blade 4 and also in a plane normal thereto.

Obviously, because of the double edged blade carried by the elongated handle, the tool may be employed by either a right or left handed operator. In cutting, the tool is swung in much the same manner as a golf club, namely, in a radius tangential to the ground and with the blade substantially parallel with the ground at the point of impact with the object to be struck.

The handle is of sufficient length to permit an operator to grasp and swing the ax from an upright position. Because of the normally horizontal position of the blade, brush and roots may be efficiently cut at practically the ground level, while the operator may stand to one side of the object to be struck.

The tool has been extensively used and found to have important advantages over the ordinary ax or grub hoe in clearing land of brush or roots, inasmuch as it is not necessary to bend uncomfortably to sever the brush nor is the tool swung in a vertical arc towards the operator's feet.

The ax head comprises only two parts, namely, the double edged blade and the handle socket secured thereto and is consequently of simple and rugged structure.

While the ax may be employed by either a right or left handed operator, it is oftentimes desirable when one cutting edge has become dull, to reverse the blade so that the other edge may be utilized. This is quickly done by removing the bolts 9 and reversing the position of the socket 7, inclining the same towards the opposite non-cutting edge and re-securing the socket to the blade 4 in such position.

It will be understood that further changes in the form, details and arrangement of parts may be made without departing from the scope of this invention.

What is claimed is:

1. An ax comprising a relatively heavy generally rectangular head provided with a sharpened cutting blade at one edge thereof, an elongated handle secured to said head at an oblique angle thereto and having its longitudinal center line substantially disposed in a plane which extends perpendicularly to said head and substantially parallel with the edge of said blade, the connection between said handle and said head being approximately at the center of gravity of said head and the weight of said head being so balanced relatively to the handle that the device may be swung in the manner of a golf club to cut brush or saplings close to the ground.

2. A brush ax comprising a relatively heavy, generally rectangular head of substantially uniform cross section throughout having sharpened blades at two opposite edges thereof, an elongated handle secured to said head at an oblique angle thereto, the connection between said handle and said head being approximately at the center of said head, the longitudinal center line of said handle lying approximately in a plane which is perpendicular to said head and substantially parallel with said blades and the weight of said head being so balanced relatively to said handle that the ax may be swung in the manner of a golf club to cut brush or saplings close to the ground.

In testimony whereof I affix my signature.

ALBERT N. SCHAEFER.